United States Patent [19]

King et al.

[11] E Re. 30,637

[45] Reissued Jun. 9, 1981

[54] VEHICLE DISPATCH INDICATOR WITH COLOR-CODED, ALPHABETICAL AND NUMERICAL INDICIA

[76] Inventors: John H. King, 6801 S. Pulaski Rd., Chicago, Ill. 60629; William C. Gore, P.O. Box 821, Elgin, Ill. 60120

[21] Appl. No.: 77,605

[22] Filed: Sep. 21, 1979

Related U.S. Patent Documents

Reissue of:

[64] Patent No.: 3,996,681
Issued: Dec. 14, 1976
Appl. No.: 495,646
Filed: Aug. 8, 1974

[51] Int. Cl.[3] ..... G09F 11/04; G09F 21/04

[52] U.S. Cl. ..... 40/495; 40/590; 116/315; 116/319

[58] Field of Search ..... 40/495, 496, 588, 589, 40/590, 591, 112, 113, 115; 116/309-320

[56] References Cited

U.S. PATENT DOCUMENTS

| | | | |
|---|---|---|---|
| 768,689 | 8/1904 | Poli | 116/315 |
| 1,374,788 | 4/1921 | Walker | 40/495 |
| 3,198,923 | 8/1965 | Tripp | 116/318 |

*Primary Examiner*—John F. Pitrelli
*Attorney, Agent, or Firm*—Gerlach, O'Brien & Kleinke

[57] ABSTRACT

A multi-dial, manually operable indicator employing color-coded, alphabetical and numerical indicia which are indicative of railway or road vehicle destinations, regardless of whether they may be local or outbound, major or minor vehicle defects requiring repair, other varied information requiring matching of indicia for proper vehicle selection, and other indicia affording useful information to the driver of the associated vehicle or highway or railway personnel. A novel clutch mechanism which is effective under the control of a single knob affords selective dial rotation while other manually operable knobs effect pointer operations indicative of the condition of special vehicle equipment such as refrigeration apparatus or the like.

6 Claims, 9 Drawing Figures

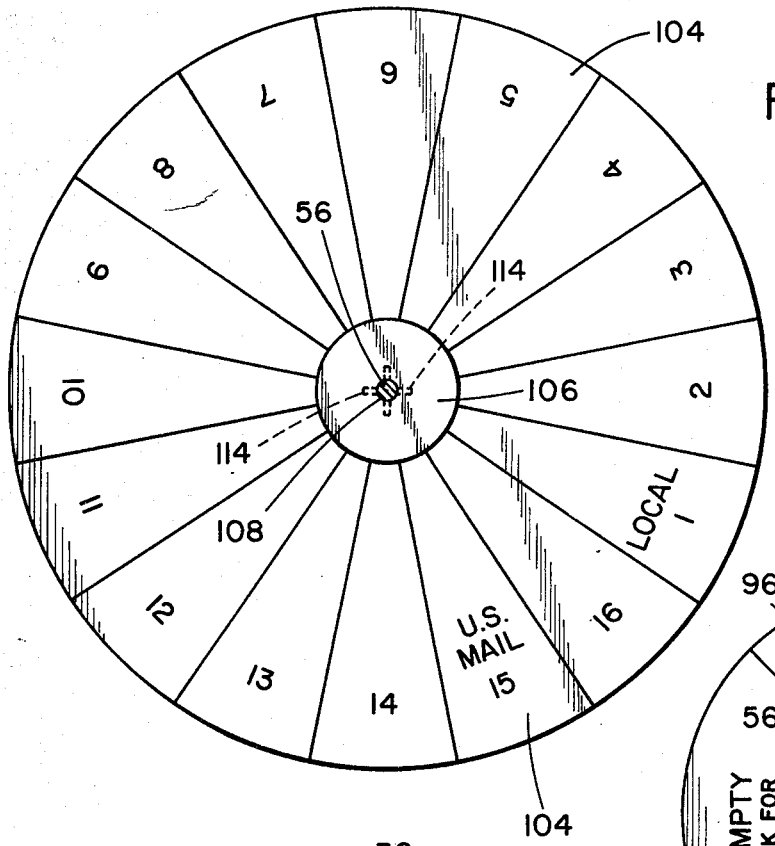
FIG.4
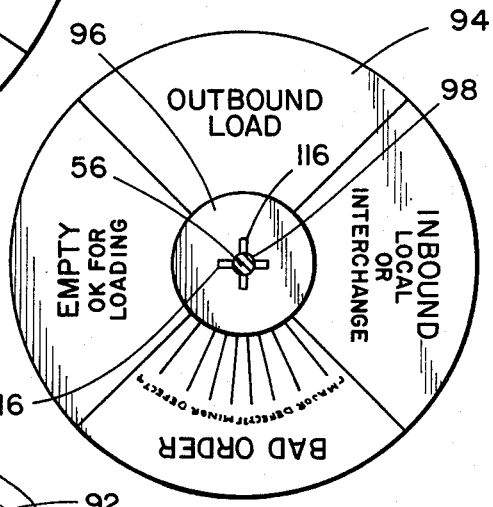
FIG.5
FIG.6
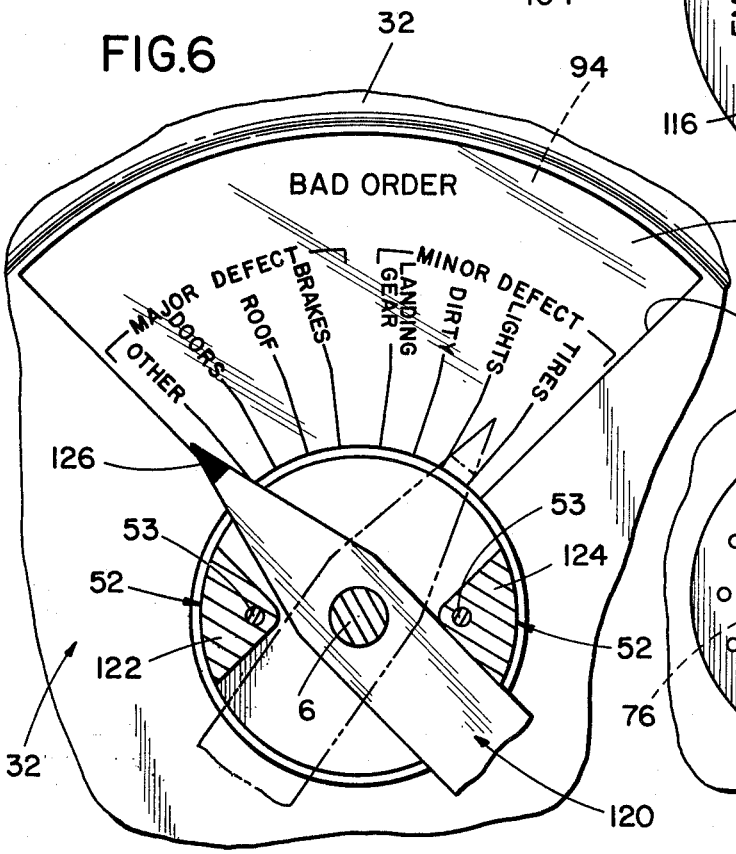
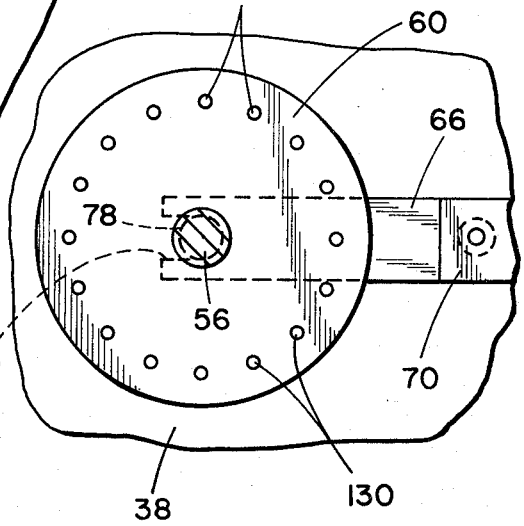
FIG.7

VEHICLE DISPATCH INDICATOR WITH COLOR-CODED, ALPHABETICAL AND NUMERICAL INDICIA

Matter enclosed in heavy brackets [ ] appears in the original patent but forms no part of this reissue specification; matter printed in italics indicates the additions made by reissue.

The improved vehicle dispatch indicator which constitutes the present invention is designed primarily for use in connection with freight-carrying, tractor-drawn vehicles or trailers and the primary purpose thereof is to facilitate dispatch of such vehicles from a railroad freight yard where trailers have been brought in piggyback style, for example, or for dispatch of the vehicles from an interline or other terminal. The invention is, however, capable of other uses and a dispatch indicator embodying the principles of the invention is adaptable to use, with or without modification as required, in connection with the dispatch of railway freight cars or the like or of containers in which items of merchandise are packaged, such containers being consigned to different destinations. Under certain circumstances, it may be found practical to use the present indicator in connection with vehicles which are supplied by various "rent-a-car" establishments or by truck or trailer rental agencies. Irrespective, however, of the particular use to which the present invention may be put, the essential features of the invention are at all times preserved.

The identification and routing of highway or railroad freight vehicles is the subject of much effort by industry. Insofar as highway vehicles, such, for example, as freight-carrying trailers are concerned, it is currently common practice manually to affix tags or the like to such vehicles, the tags setting forth the designations of the various vehicles to which they are attached. Under certain circumstances, additional information is applied to such tags as, for example, indications that the vehicles are defective and also information as to the nature of the various defects. Alternatively, separate tags are affixed to the vehicles to supply such information. The use of such tags is not a uniform procedure, is subject to much misunderstanding as the result of different interpretations by different drivers, and leads to much confusion. In addition to this, such tags are easily removed and frequently they are blown away or defaced due to weather conditions. Still further, the tags are expandable and must be replaced each time a vehicle destination is changed, or discarded when a mechanical defect has been cured or a condition changed. Literally, thousands of such tags are in use and they are quite costly.

The present invention is designed to overcome the above-noted limitations that are attendant upon present-day vehicle identification by the use of tags or the like and, toward this end, the invention contemplates the provision of a novel self-contained, manually operable, indicator which employs color-coded, alphabetical and numerical indicia, the latter being indicative of vehicle destinations, vehicle defects requiring attention, and other varied information. The device is intended to be permanently applied to a vehicle and the information which it exhibits is readily visible while the vehicle is standing still or may be detected by suitable electronic or other scanning equipment when the vehicle is moving at high speed.

According to the invention, a major portion of the information which it serves to convey is of a color-coded nature and is supplied by two rotary dials which are selectively operable so that the information contained thereon is visible through windows or openings in the housing of the device. Selective manipulation of the dials for information change purposes is attained by means of a novel clutch mechanism which is so designed that push or pull operations which are applied to a control knob and are accompanied by rotation will effect rotation of ne of the other of the dials. It is contemplated that one of the dials will be used to supply information relating to vehicle destination or designation, while the other dial will be used to supply information relating to vehicle condition. Still other information as, for example, such as relates to the condition of the refrigeration system which is associated with any given vehicle, may be supplied by a separate and fixed dial having associated therewith a manually operable pointer.

The provision of a vehicle dispatch indicator such as has briefly been outlined above constitutes the principal object of the present invention.

The provision of an indicator which is simple in its construction and, therefore, may be manufactured at a relatively low cost; one which is comprised of a minimum number of parts, particularly relatively moving parts and, therefore, is unlikely to get out of order; one which is rugged and durable and, therefore will withstand rough usage; one which is readily understandable and, therefore, requires no particular degree of skill for its manipulation; one which readily lends itself to universal color code designations involving a large number of coded colors; one which is entirely weatherproof and therefore, is not subject to deterioration during inclement weather; one which is capable of ease of assembly or dismantlement for purposes of inspection, replacement, or repair of parts; one which is attractive in its appearance and pleasing in its design; and one which otherwise is well-adapted to perform the services required of it, are further desirable features which have been borne in mind in the production and development of the present invention.

Other objects and advantages of the invention not at this time enumerated will readily become apparent as the nature of the invention is better understood from a consideration of the following detailed description.

The invention consists in the several novel features which are hereinafter set forth and are more particularly defined by the claims at the conclusion hereof.

In the accompanying three sheets of drawings forming a part of this specification, one illustrative embodiment of the invention is shown.

In these drawings:

FIG. 4 is a reduced size but radially extended sectional view taken on the line 4—4 of FIG. 2 and indicating the nature of the rear dial assembly which is employed in connection with the invention;

FIG. 5 is a reduced size but radially extended view taken on the line 5—5 of FIG. 2 and indicating the nature of the front dial assembly which is employed in connection with the invention;

FIG. 6 is a sectional view taken on the line 6—6 of FIG. 2;

FIG. 7 is a sectional view taken on the line 7—7 of FIG. 2;

Figure 8:
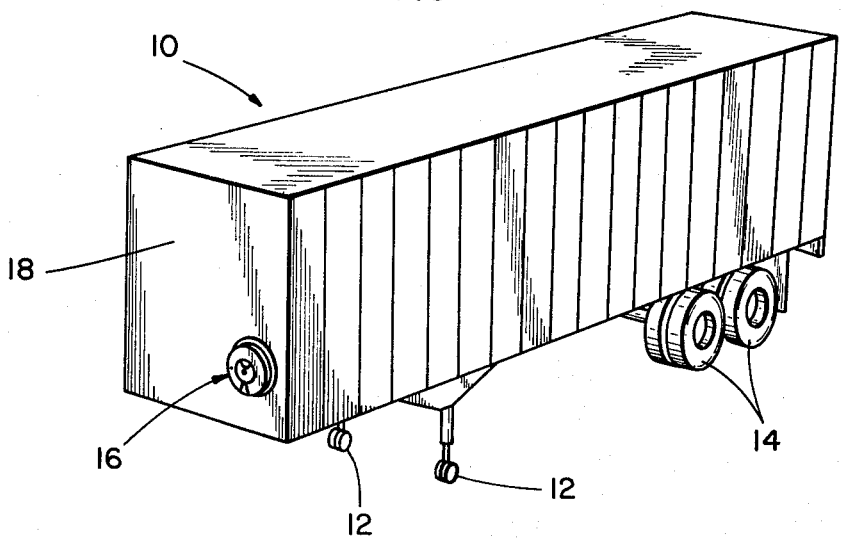
FIG. 8 is a perspective view of a tractor-drawn freight-carrying trailer, showing the indicator of the present invention operatively applied thereto.
Figure 9:
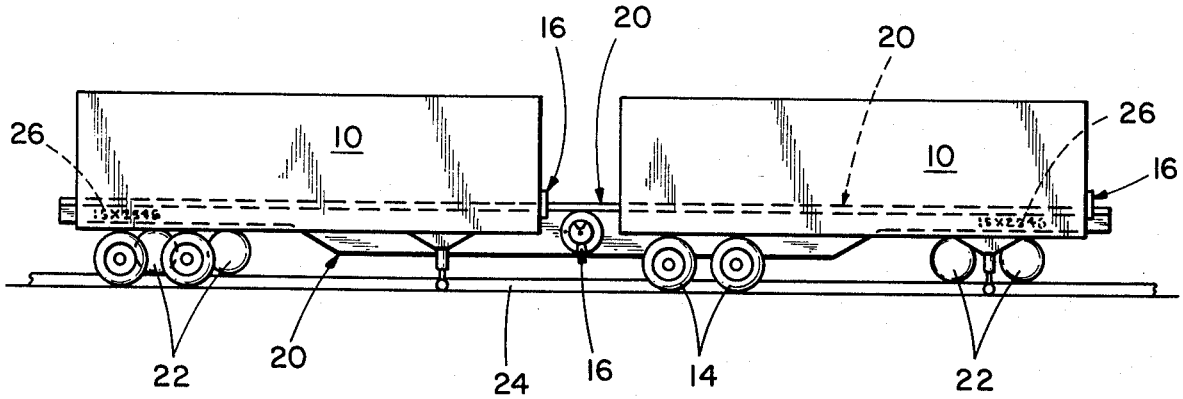
FIG. 9 is a side elevational view of a railroad flatcar, showing two indicator-equipped freight-carrying trailers positioned alongside thereof, preparatory to the mounting of such trailers on the flatcar in piggy-back fashion.

Referring now to the drawings in detail and in particular to FIGS. 8 and 9, these two views are presented herein as being illustrative of the use to which the present indicator may be put when associated with freight-carrying tractor-drawn vehicles (trailers) which are designed for highway travel. One such vehicle 10 is disclosed in FIG. 8 and it is shown as being detached from its tractor and supported in the usual manner in a stationary position by means of the usual jack devices 12. The vehicle which has been selected for disclosure herein is of the dual-axle. box-car type having wheels 14, and an indicator embodying the present invention and designated in its entirety by the reference numeral 16 is shown as being operatively applied to the vehicle 10, the application preferably, but not necessarily, being effected near the lower right-hand corner of the front wall 18 of the vehicle body. The reason for this preferential application of the device 16 to the vehicle body will be made clear when the nature of the device is fully set forth hereafter. In FIG. 9 of the drawings, a railway flatcar 20 having flanged wheels 22 is shown as being mounted on rails 24, and a pair of the indicator-equipped freight-carrying trailers 10 is shown as being disposed in the parked end-to-end relationship alongside the flatcar 20 and resting on the ground after having been lowered in the usual manner from their piggy-back relationship on the flatcar. The presentation of FIG. 9 herein is made in order to indicate that the usual flatcar serial number or other identifying indicia which ordinarily is applied to the opposite end regions of the opposite sides of the flatcar and which has been designated herein by the reference numeral 26 ordinarily becomes concealed behind such parked vehicles in a railway yard, and also to show that the application of the present indicator 16 to the front walls 18 of a vehicle eliminates the necessity of a driver dismounting from his tractor to walk behind the vehicle to identify the particular flatcar, all in a manner and for a purpose that will become clear when the nature of the invention is better understood.

Figure 1:
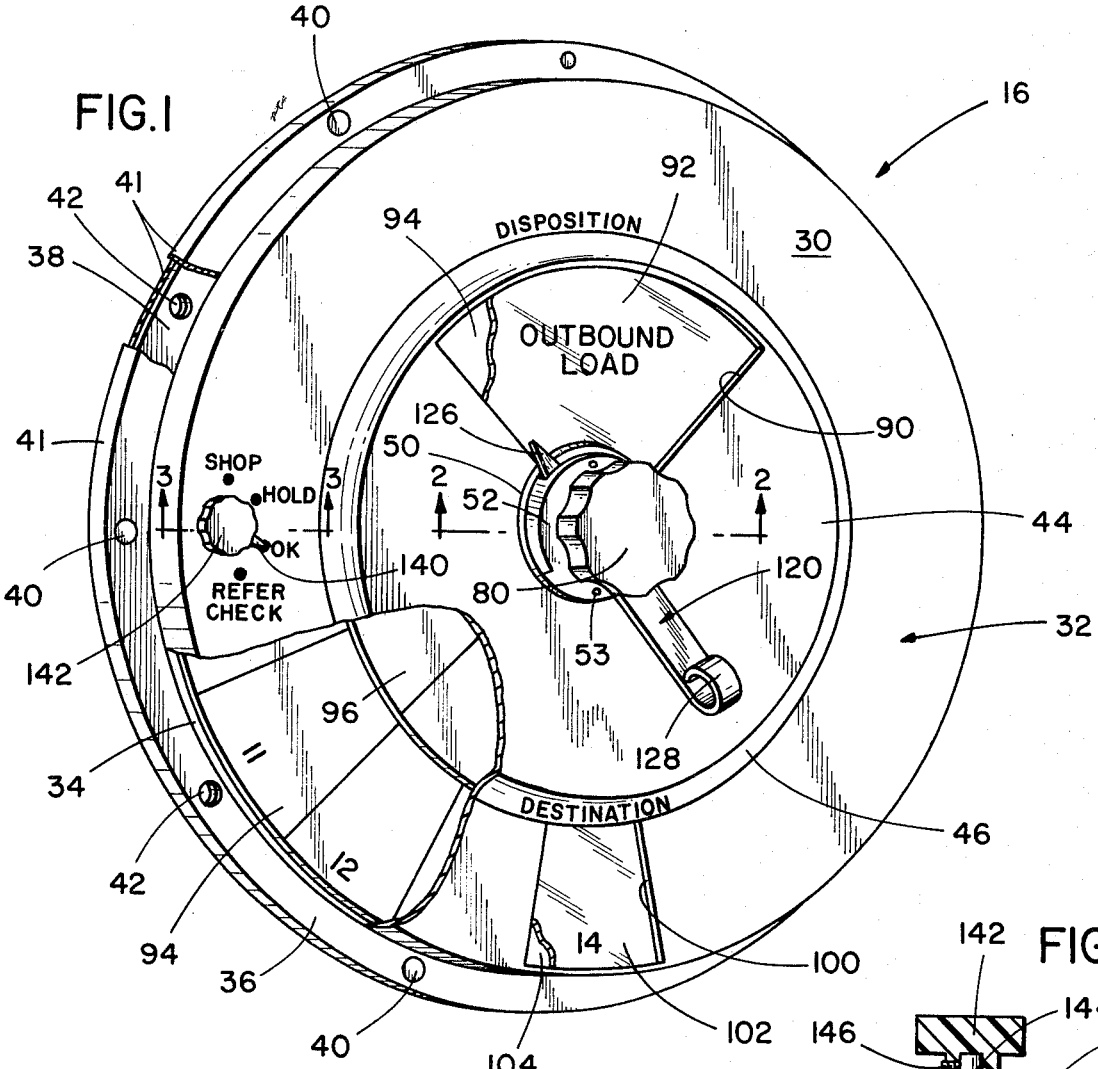
FIG. 1 is a front perspective view of a vehicle dispatch indicator embodying the principles of the present invention, a certain portion of the housing of the indicator being broken away for illustrative purposes.
Figure 2:
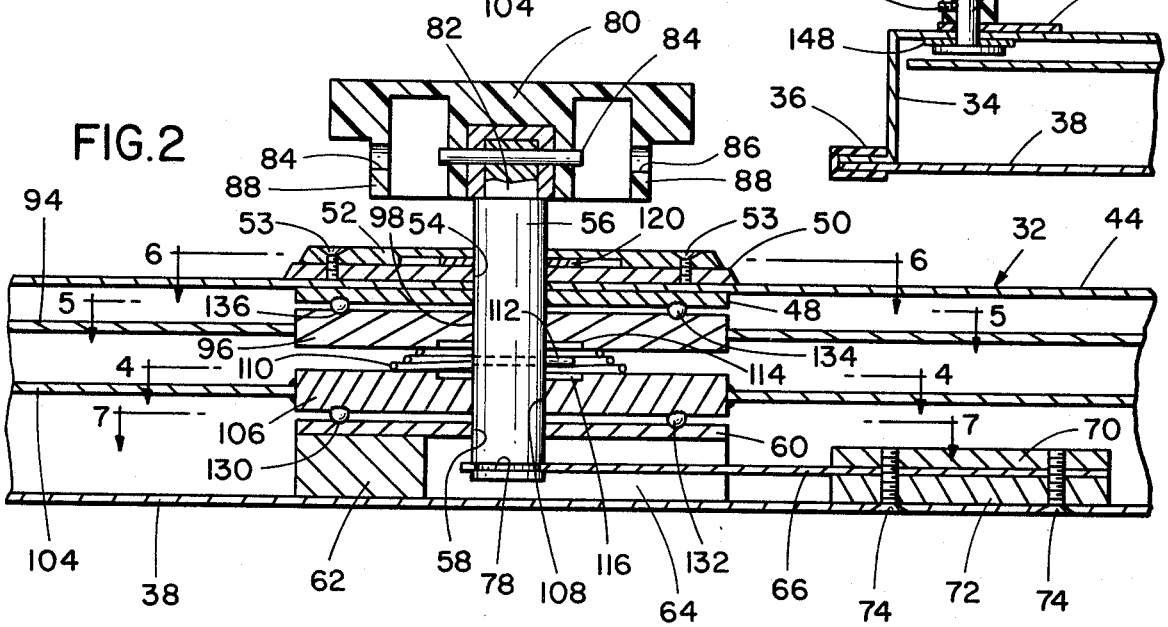
FIG. 2 is a fragmentary sectional view taken substantially on the horizontal plane indicated by the line 2—2 of FIG. 1 and in the direction of the arrows.

Referring now to FIGS. 1 to 7, inclusive, and in particular to FIGS. 1 and 2, the aforementioned indicator 16 involves in its general organization an outer shallow generally cup-shaped housing 30 having a circular front wall 32, a narrow cylindrical side wall 34, and a normally open rim from which there extends radially outwards a rim flange 36. A circular back plate 38 closes the normally open rim of the housing 30 and is permanently secured by rivets 40 to the rim flange 36. The outer periphery of the annular rim flange 36 is rolled or beaded around the periphery or rim of the back plate 38 as indicated at 41 in FIG. 1, and holes 42 extend through both the back plate 38 and the rim flange 36 for the reception of mounting screws or pop rivets whereby the housing 30 of the indicator 16 may be affixed to the front wall 18 of the trailer 10. When the indicator is in its normal position of use as shown in FIG. 8, the housing 30 extends vertically.

The central region of the front wall 32 of the indicator housing 30 is formed with an outwardly offset circular portion 44 which joins with the general plane of the front wall by means of a frusto-conical side wall 46 of small slant height. Inner and outer circular hub plates 48 and 50 are welded or otherwise fixedly secured to the offset circular portion 44 and serve to reinforce the central region of such latter portion. A third hub plate 52 is secured by screws 53 (see FIGS. 2 and 6) to the outer hub plate 50 and serves a function that will be made clear presently. The three hub plates 48, 50 and 52, as well as the offset circular portion 44 of the housing front wall 32, are formed with registering central openings therethrough, such openings being collectively designated by the reference numeral 54. Projecting through the openings 54 is an axially and horizontally extending shaft 56, the latter being both slidable and rotatable within the openings. The openings 54 thus establish a journal bearing for the shaft 56. The inner end region of the shaft is similarly journalled in an opening 58 which is formed in a reaction plate 60, the latter, in effect, constituting the front wall of an elongated hood-like structure which is fixedly mounted on the inner surface of the back plate 38 of the casing 30. Said hood-like structure also includes a relatively thick end wall 62 and a pair of parallel side walls 64 but on of which appears in FIG. 2. The end of the hook-like structure which is remote from the end wall 62 is open and receives therethrough a flat leaf spring 66 (see FIG. 7). The leaf spring 66 has its proximate end clamped between a pair of clamping blocks including an outer block 70 and an inner block 72. Clamp screws 74 serve to effect the clamping operation, as well as to maintain the leaf spring 66 in a position spaced a small distance from the back plate 38 of the housing 30. The distal end of the leaf spring 66 is bifurcated as indicated at 76 in FIG. 7 and the furcations thereof straddle the shaft 56 and project into an annular groove 78 in the inner end region of said shaft. The leaf spring 66 thus serves to maintain the shaft in an axially fixed position when the spring is in its free or normal state. The shaft 56 is, however, capable of limited axial shifting movement through the various openings 54 and 58 in either direction and, during such shifting movement, the spring 66 flexes slightly but returns to its normal condition when axial pressure or tension on the shaft 56 is released, all in a manner and for a purpose that will be made clear presently.

Rotation of the shaft 56, as well as axial shifting thereof, is made possible by means of a control knob 80 which is mounted on a reduced outer front or outer end region 82 of the shaft. A diametrically extending drive pin 84 serves to secure the knob 80 in position on the front end of the shaft 56, while holes 86 in an apron portion 88 which is associated with the knob 80 facilitate installation of the drive pin 84.

As shown in FIG. 1 of the drawings, a sector-shaped window or viewing opening 90 is provided in the offset circuit portion 44 of the front wall 32 of the housing 30, the opening being closed by a transparent sheet 92 which may be formed of glass or a suitable plastic material. Immediately behind such viewing opening 90 is a rotary circular front dial plate 94 of relatively small diameter (see also FIG. 2) and the radius of which is approximately equal to that of said offset circular portion 44. Such dial plate 94 is provided with a central hub 96 having extending therethrough a central opening 98 through which the front end region of the shaft 56 loosely projects.

The peripheral region of the front wall 32 of the housing 30 has formed therein a sector-shaped window or viewing opening 100, and this is located at the bottom portion of the housing as viewed in FIG. 1, such opening being closed by a transparent sheet 102 which, like the sheet 92, may be either of glass or suitable plastic material. Immediately behind the opening 100 is a rotary circular rear dial plate 104 of relatively large diameter and the radius of which is slightly less than that of the housing side wall 34. The dial plate 104 is provided with a central hub 106 having extending therethrough a central opening 108 through which the central portion of the shaft 56 projects loosely.

Bearing in mind that both of the hubs 96 and 106 loosely encompass the shaft 56, a single conical compression spring 110 encompasses the central portion of the shaft 56 and is interposed between the two hubs 96 and 106, the spring serving yieldingly to bias the front dial plate 94 forwardly within the housing 30, i.e., upwardly as viewed in FIG. 2, and to bias the rear dial plate 104 rearwardly, i.e., downwardly as viewed in FIG. 2.

The shaft 56 is provided with a clutch device by means of which it is capable of selectively applying torque to the two dial plates 94 and 104, such clutch device comprising a radially projecting clutch pin or finger 112 which extends radially outwardly from the medial or central portion of the shaft 56 and is designed for cooperation with a series of four or more radial clutch recesses 114 (see FIG. 4) in the rear face of the hub 106 and with a similar series of radial clutch recesses 116 (see FIG. 5) in the front face of the hub 96, depending, of course, upon the axial position of the shaft 56. Upon inward shift of the knob 80, and consequently, of the shaft 56, the radial clutch pin or finger 112 will enter one of the clutch recesses 116 so that if the shaft 56 is rotated in one direction or the other while maintaining the knob on its shifted position, the clutch finger 112 will apply torque to the dial plate 104 for rotational purposes. Similarly, if the knob is pulled forwardly or outwardly away from the housing 30 and simultaneously rotated in one direction or the other, the clutch finger 112 will enter one of the four recesses 114 in the rear face of the hub 96 and cause a corresponding rotation of the dial plate 94.

Rotation of the knob 80 and the shaft 56 when the shaft is in its neutral position as the result of being neither shifted inwards nor pulled outwardly will be without function since the clutch pin or finger 112 will be out of contact with the recess in either the hub 96 or the hub 106.

It will be understood that calibration or the application of indica to the dial plates 94 and 104 will be made according to the particular use to which the indicator as a whole is intended to be used. In the exemplary form of the invention wherein the indicator is employed as a vehicle dispatch indicator, it is contemplated that the rear dial plate 104 shall be divided into sectors as shown in FIG. 4 and that differently colored sectors be employed according to a readily understandable color code to indicate vehicle destinations as, for example, cites, states, or other geographical areas. For exemplary purposes, the disk-like dial plate 104 is shown as being divided into sixteen sectors, each sector, in addition to be differently colored from each other sector, being supplied with a numeral which becomes visible through the window opening 100 when its associated sector is aligned with such opening. Additional printed or otherwise marked indicia may also be applied to the various sectors as desired, examples of such indicia being the words "U.S. MAIL" in sector No. 15 and the word "LOCAL" in sector No. 1.

Where vehicle dispatch use is intended for the indicator 16, it is contemplated that the small forward dial plate 94 shall be divided into four 90° sectors, likewise color coded in a readily understandable manner with the individual sectors having printed indicia or information thereon. As shown in FIG. 5, the sector labelled "EMPTY OK FOR LOADING" may be colored green. The sector labelled "INBOUND LOCAL OR INTERCHANGE" may be colored white. The sector labelled "OUTBOUND" indicates that the trailer is loaded and ready for shipment and it may be colored yellow. The sector labelled "BAD ORDER" is intended to imply that there is a defect and that the trailer should not be loaded nor transported commercially. This latter sector appears through the window opening 90 in FIG. 6 and, as shown in this view, the specific nature of the defect is printed in the vicinity of a series of radially extending word-type indicia which are designed for cooperation with a manually operable pointer arm 120, they being also shown, at least in part, in FIG. 1.

The pointer arm 120 is pivotally mounted on the front or outer end region of the shaft 56 for swinging movement about the axis of the latter between the full and dotted-line positions in which it is shown in FIG. 6. The pointer arm is confined between the aformentioned hub plates 50 and 52 and the extent of its approximately 90° travel is limited by a pair of generally triangular limit stops 122 and 124, the latter being integrally formed on the inner side of the hub plate 52. Said pointer arm 120 is provided at its inner end with an indicating pointer 126 (see FIGS. 1 and 6) and at its outer end with a rolled or bent manipulating loop 128, the latter being accessible from the outside the casing 30. The pointer 20 is functional only when the sector labelled "BAD ORDER" is in position behind the window opening 90 although, if desired, radial markings similar to those employed on the "BAD ORDER" sector of the small forward dial 94 may be applied to any or all of the other sectors of the dial plate 94 for cooperation with the pointer 126 of the pivoted pointer arm 120.

Referring now to FIGS. 2 to 7 of the drawings, detent means are provided for effecting accurate register of the various indicating sectors of the rear dial plate 104 with the window opening 100. Accordingly, the front face of the plate 60 has formed therein a circular row of detent recesses 130, there being one recess for each sector of said dial plate 104. Fixedly secured as by welding in small pockets in the rear face of the hub 106 of the dial plate 104 is a series of circumferentially arranged detent balls 132. The particular number of balls 132 employed is not critical, four quadrilaterally arranged balls being adequate for the intended purpose. Since the conical spring 110 serves yieldingly to bias the plate 104 and its associated hub 106 rearwardly toward the plate 60, it will be apparent that the detent balls 132 and recesses 130 effect the necessary detent action between the hub 106 and the plate 60 whereby the balls may ride out of respective recesses 130, slide circumferentially about the front face of the plate 60 and then enter the next adjacent recesses each time the dial 104 is indexed one sector, the plate 60 acting as a reaction plate.

Similar detent means are also provided for effecting accurate register of the various indicating sectors of the front dial plate 94 with the window opening 90, such detent means assuming the form of fixed detent balls 134 on the rear or back side of the circular hub plate 48 and a series of four cooperating quadrilaterally arranged detent recesses 136 on the front face of the hub 96. The desired detent action takes place incident to the forward pressure of the spring 110 against the hub 96 which yieldingly urges the latter toward the reaction hub plate 48.

Figure 3:
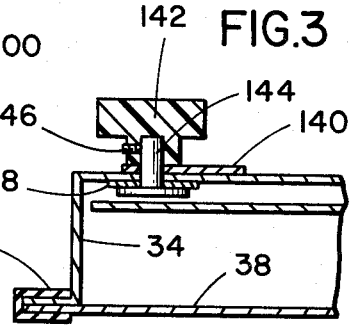
FIG. 3 is an enlarged fragmentary horizontal sectional view taken on the line 3—3 of FIG. 1 and in the direction of the arrows.

Referring now to FIGS. 1 and 3 of the drawings, at a suitable region around the peripheral region of the front wall 32 of the casing 30, dial and pointer means are provided for indicating the condition of special equipment, as for example, the condition of any refrigeration system which may be associated with the trailer vehicle. Accordingly, as shown in FIG. 3, a small pointer 140 is operable under the control of a rotary knob 142 and cooperates with a series of three color coded indicia which may be in the form of circular spots on the front face of the front wall 32 of the housing 30. Preferably the color green will indicate that the refrigeration system is in good condition, the color red will indicate that the system is defective and requires major repairs, while the color yellow will indicate that the system requires minor repairs or is on "hold" because of being out of fuel and, consequently, requires re-starting in order to maintain the proper temperature within the associated trailor vehicle. As shown in FIG. 3, the rotary knob 142 is secured on a headed retaining pin 144 by means of a set screw 146, while a "Belleville" type washer 148 offers the necessary frictional restraint to maintain the pointer 140 in any selected indicating position.

It is deemed unnecessary to describe the operation of the herein disclosed dispatch indicator with specific reference to any particular color-coding system or to any particular numerical or other indicia which may be applied to the various disk sectors. It is recognized that the color red has universally been adopted, as in the case of a conventional stop and go street signal, to indicate danger or otherwise to place a restriction upon the driver of a vehicle and, therefore, it is quite appropriate to use a color code herein wherein the color red indicates a bad order defect insofar as the forward dial plate 94 is concerned, and to indicate a bad order defect such as an improperly working refrigeration system insofar as the pointer 126 and its associated indicia are concerned. Similarly, the use of the color green to indiciate a trailer vehicle which is in good order, i.e., ready for loading, appears to be appropriate. The primary color yellow for the same reasons appears to be appropriate to designate a trailer that is completely loaded and ready for shipment. Obviously, the invention is not to be limited to any specific color code or to any particular printed or otherwise marked indicia, especially since indicators embodying the principles of the invention may be found useful in connection with the shipment of individual parcels, containers, packages, crates or the like emanating from a storage area and irrespective of any particular mode of transportation.

In the operation of the herein described indicator 16, the flat leaf spring 66 will normally maintain the shaft 56 and its clutch component, namely, the radial pin or finger 112, in a neutral or inoperative position so that rotation of the control knob 80 will be without function. When it is desired to effect a change in the indicia appearing in the window opening 100, it is merely necessary for the operator manually to push or shift inwards (rearwards) the control knob 80, whereupon the shaft 56 will shift rearwardly, thus flexing the leaf spring 66 and causing the clutch finger 112 to engage the upper surface of the hub 106. If the radial clutch finger 112 happens to register vertically with one of the several radial clutch recesses 116, such finger will immediately enter the recess. If the finger and a recess are not in vertical register, a slight degree of rotational movement of the knob 80 in one direction or the other while still maintaining rearward pressure thereon will cause the finger to seek the nearest recess for entry purposes. After the finger 112 has thus entered a particular recess, the knob may be turned in either direction and, when so turned, the finger will apply torque to the hub 106 and, consequently, the dial plate 104 as a whole. This rotation of the dial plate may be continued until the desired sector of the plate appears behind the window opening 100. During such rotation of the dial plate 104, the detent balls 130 which are fixedly mounted on and move bodily with the hub 106 will traverse the depressions 130 in the plate 60 and finally come to rest in a selected depression where the desired indicia sector is visible through the window opening 100. Upon release of the control knob 80, the flat, but now flexed, leaf spring 66 will again assume its flat planar condition, thereby moving the shaft 56 to its neutral position and withdrawing the radial clutch pin 112 from the clutch recess 116.

When it is desired to effect a change in the indicia appearing in the window opening 90, the operator will pull the control knob 80 forwardly, i.e., away from the front wall 32 of the indicator housing 30, thereby causing the shaft 56 to slide forwardly and bring the radial clutch finger 112 into engagement with the rear face of the hub 96, thereby causing the flat leaf spring 66 to flex forwardly. Rotation of the control knob 80 in either direction while maintaining an outward pull thereon will cause rotation of the shaft 56 until such time as the radial clutch finger 112 enters one of the radial clutch recesses 114 in the rear side of the hub 96. Continued rotation of the knob 80 will then cause torque to be transmitted to the hub 96 by the finger 112 and, as a consequence, the dial plate 94 will be rotated until such time as the desired indicia sector is caused to register with the window opening 90. Release of the control knob 90 will cause the shaft 56 to be returned to its neutral position under the influence of the leaf spring 66.

If the operator selects the particular sector which is labelled "BAD ORDER" and is preferably colored red, the specific cause of such bad order or defect may be indicated by manipulating the pointer arm 120 until its pointer 126 registers with the particular radial marking which indicates such cause. Finally, if the trailer or other vehicle to which the indicator 16 is applied is equipped with refrigeration apparatus, the condition of such apparatus may readily be indicated by manipulation of the control knob 142 in the manner previously indicated.

The utility of the present indicator when employed in connection with highway trailer dispatching operations is exemplified in FIGS. 8 and 9. Positioning of the devices on the front walls 18 of the trailer vehicles at the region indicated in FIG. 8 affords a convenient viewing angle for a driver of a tractor passing along a row of such trailers for trailer-identification purposes, especially since such vehicles are ordinarily aligned in rows in end-to-end fashion.

When trailers of the character under consideration are deposited in a railway freight yard as shown in FIG. 9, they are ordinarily positioned on the ground alongside the various flatcars from which they have been unloaded, two such trailers being assigned to each flatcar. In such an instance, the over-all length of the two trailers when positioned in end-to-end fashion is approximately equal to or slightly less than the length of the flatcar so that the usual serial numbers 26 which are applied to the side walls of the flatcar are concealed by the trailers. In such an instance, if a particular driver is attempting to locate a given flatcar and its associated trailers, he is obliged to dismount from his tractor and walk behind one of the trailers in order to ascertain the flatcar serial number. By the use of the present indicator, his code book or sheet will inform him of the color-coded information he is seeking and, when he recognizes it upon approaching the proper trailer vehicle or vehicles, there will be no necessity for him to dismount for the purpose of railway flatcar identification.

The invention is not to be limited to the exact arrangement of parts shown in the accompanying drawings or described in this specification as various changes in the details of construction may be resorted to without departing from the spirit or scope of the invention. For example, although the particular indicator which is illustrated and described herein has been specifically related to the dispatch of tractor-drawn freight-carrying trailer vehicles, it will be distinctly understood that other uses for the indicator are contemplated, as, for example, the identification and dispatching of railway vehicles, large-strapped cartons, crates, or other packages or the like, or for the dispatching of merchandise, or the identification thereof, regardless of the nature of such merchandise. Therefore, only insofar as the invention is particularly pointed out in the accompanying claims is the same to be limited.

Having thus described the invention what we claim as new and desire to secure by letters patent is:

1. A dispatch indicator designed for application to a vehicle or other merchandise-enclosing container and adapted to *assume an upright position on the vehicle and* render shipping instructions, said indicator comprising a housing having a rear wall, a front wall and an interconnecting continuous side wall, said front wall being provided with a central hub, a *horizontal* shaft mounted in said hub for rotation and also limited axial sliding movement endwise therethrough, said front wall being provided with a first viewing opening in the peripheral region thereof and with a second viewing opening in the medial portion thereof at a region displaced radially inwardly of the first viewing opening, a relatively large diameter circular rear dial plate coaxial with said shaft and *having a centrally disposed opening* through which the [latter] *shaft* loosely projects, a relatively small diameter circular front dial plate coaxial with said shaft and *having a centrally disposed opening* through which the [latter] *shaft* loosely projects, said large diameter *rear* dial *plate* presenting indicia sectors which are visible through said first viewing opening, said small diameter *front* dial *plate* presenting indicia sectors which are visible through said second viewing opening, spring means interposed between said *front and rear* dial plates *and serving* yieldingly [biasing] *to bias* the same apart, a fixed front reaction plate carried by said front wall for assimilating [the rearward] thrust of said front dial plate *in the direction of said front wall*, a fixed rear reaction plate carried by said rear wall for assimilating [the forward] thrust of the rear dial plate *in the direction of said rear wall*, each [reaction] *dial* plate being formed *in the central portion thereof* with a plurality of radially extending clutch recesses therein, a radially projecting clutch finger mounted on said shaft and designed for selective cooperation with said recesses depending upon the axial position of said shaft, means for yieldingly biasing said shaft to a medial position wherein said clutch finger is out of effective engagement with said dial plates, a circular row of detent depressions and a series of fixed cooperating detent protuberances effective between each dial plate and its associated fixed reaction plate to restrain rotational movement of such plate when an indicia sector thereon is in register with its associated viewing opening, and a control knob mounted on the forward end of said shaft exteriorly of the housing *and adapted for use in rotating and axially shifting said shaft.*

2. A dispatch indicator as set forth in claim 1 and wherein the circular rows of depressions are provided in the reaction plates and the protuberances are provided on the dial plates.

3. A dispatch indicator as set forth in claim 2 and wherein the protuberances on the dial plates are in the form of small diameter balls which are fixedly set within commensurately shaped pockets which are formed in [such] *said* dial plates.

4. A dispatch indicator designed for application to a vehicle or other merchandise-enclosing container and adapted to *assume an upright position on the vehicle and* render visual shipping instructions, said indicator comprising a housing having a rear wall, a front wall and an interconnecting continuous side wall, said front wall being provided with a central hub, a *horizontal* shaft mounted in said hub for rotation and also limited axial sliding movement endwise therethrough, said front wall being provided with a first viewing opening in the peripheral region thereof and with a second viewing opening in the medial portion thereof at a region displaced radially inwardly of the first viewing opening, a relatively large diameter circular rear dial plate coaxial with said shaft and through which the latter loosely projects, said large diameter dial presenting indicia sectors which are visible through said first viewing opening, said small diameter dial presenting indicia sectors which are visible through said second viewing opening, spring means interposed between said dial plates yieldingly biasing the same apart, a fixed reaction plate carried by said front wall for assimilating the rearward thrust of said front dial plate, a fixed reaction plate carried by said rear wall for assimilating the forward thrust of the rear dial plate, clutch means effective between said shaft and each dial plate for selectively rotating said plate in unison with the shaft depending upon the axial position of the latter, a control knob mounted on the forward end of said shaft exteriorly of the housing, at least one of said indicia sectors on one of said dial plates being subdivided into minor sectors, and a pointer arm projecting diametrically through said control knob and having a radial pointer proper designed for cooperation with said minor sectors, said knob being formed with clearance regions to limit the extent of swinging movement of the pointer arm with respect to said knob.

5. A dispatch indicator as set forth in claim 4 and wherein the pointer is provided on one end of the pointer arm and the other end of the pointer arm is provided with a manipulating handle.

6. A dispatch indicator as set forth in claim 5 and including, additionally, a second control knob rotatably mounted on said front wall exteriorly of the housing and embodying a radial pointer arm, and indicia are provided on said front wall in circumferentially spaced relationship relative to said second control knob and are designed for cooperation with said radial pointer arm.

* * * * *